United States Patent
Akthar et al.

(10) Patent No.: US 12,007,987 B1
(45) Date of Patent: *Jun. 11, 2024

(54) SORT OPTIMIZATION

(71) Applicant: Progress Software Corporation, Burlington, MA (US)

(72) Inventors: Mohammed Sayeed Akthar, Hyderabad (IN); Sunil Jardosh, Hyderabad (IN)

(73) Assignee: PROGRESS SOFTWARE CORPORATION, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,852

(22) Filed: Dec. 9, 2022

Related U.S. Application Data

(63) Continuation of application No. 17/104,710, filed on Nov. 25, 2020, now Pat. No. 11,537,604.

(51) Int. Cl.
  *G06F 16/242* (2019.01)
  *G06F 16/22* (2019.01)
  *G06F 16/28* (2019.01)

(52) U.S. Cl.
  CPC .......... *G06F 16/244* (2019.01); *G06F 16/221* (2019.01); *G06F 16/2282* (2019.01); *G06F 16/2445* (2019.01); *G06F 16/284* (2019.01)

(58) Field of Classification Search
  CPC .......... G06F 16/24537; G06F 16/2428; G06F 16/24544; G06F 16/24542
  USPC .................................................. 707/718, 722
  See application file for complete search history.

(56) References Cited

U.S. PATENT DOCUMENTS

| | | | |
|---|---|---|---|
| 7,734,620 B2 * | 6/2010 | Muras .............. | G06F 16/24524 707/718 |
| 10,318,491 B1 | 6/2019 | Graham | |
| 2006/0259457 A1 * | 11/2006 | Muras .............. | G06F 16/24524 |
| 2008/0021869 A1 * | 1/2008 | Muras .............. | G06F 16/24524 |
| 2012/0191698 A1 * | 7/2012 | Albrecht ............ | G06F 16/2453 707/718 |
| 2016/0055210 A1 * | 2/2016 | Beavin ............. | G06F 16/24553 707/754 |

* cited by examiner

*Primary Examiner* — Hung T Vy
(74) *Attorney, Agent, or Firm* — PATENT LAW WORKS LLP

(57) ABSTRACT

A system and method for processing of queries including receiving a query including a set operation and a sort operation, wherein the set operation includes a first data structure and a second data structure and the sort operation requests a result set that is sorted based on a column or attribute of the first data structure and a column or attribute of the second data structure; generating a query plan in which a sort operation occurs prior to the set operation; determining a first, partial set of one or more resultant rows responsive to the query; sending the first, partial set of one or more resultant rows responsive to the query to a client; determining a second, partial set of one or more resultant rows responsive to the query; and sending the second, partial set of one or more resultant rows to the client.

20 Claims, 9 Drawing Sheets

Example Query Scenario 1: 402

//Assume the following tables are created in the database — 404
    CREATE TABLE Tab1 (Col1 INTEGER, Col2 INTEGER, Col3 INTEGER);
    CREATE TABLE Tab2 (Fld1 INTEGER, Fld2 INTEGER, Fld3 INTEGER);

//Assume the following real indices are created — 406
    CREATE INDEX Tab1IdxCol1 ON Tab1(Col1);
    CREATE INDEX Tab2IdxFld2 ON Tab2(Fld2);

//Assume that the following query is received — 408
    SELECT Col1, Col2, Fld1, Fld2
    FROM   Tab1 INNER JOIN Tab2 ON Tab1.Col2 = Tab2.Fld1 ORDER BY Tab1.Col1, Tab2.Fld1;

Potential Query Plan 1 :

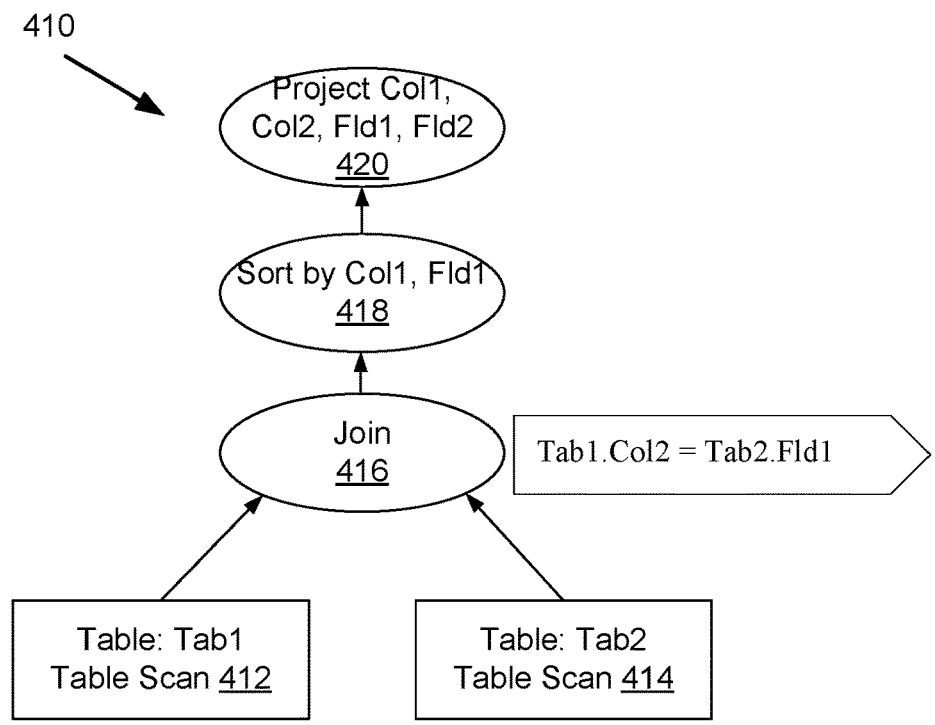

Figure 4

Example Query Scenario 2: 502

//Assume, again, that the following tables are created in the database 504
    CREATE TABLE Tab1 (Col1 INTEGER, Col2 INTEGER, Col3 INTEGER);
    CREATE TABLE Tab2 (Fld1 INTEGER, Fld2 INTEGER, Fld3 INTEGER);

//Assume, again, that the following real indices are created 506
    CREATE INDEX Tab1IdxCol1 ON Tab1(Col1);
    CREATE INDEX Tab2IdxFld2 ON Tab2(Fld2);

//Assume that the following query is received 508
    SELECT Col1, Col2, Fld1, Fld3
    FROM Tab1 INNER JOIN Tab2 ON Tab1.Col2 = Tab2.Fld1 ORDER BY
    Tab1.Col1, Tab2.Fld3;

Potential Query Plan 2:

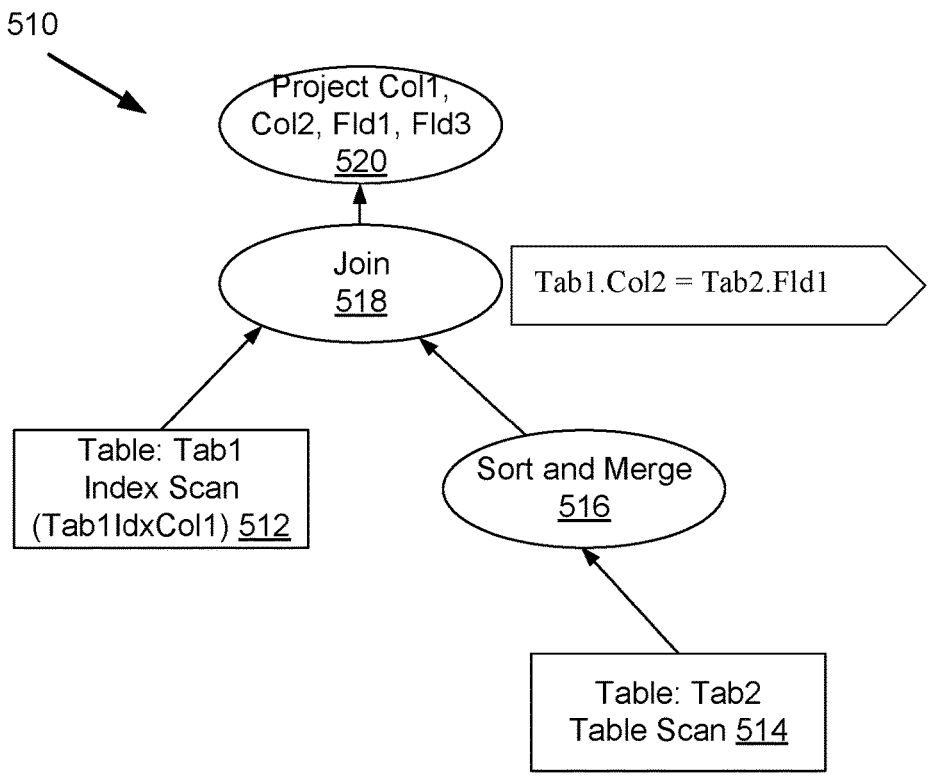

Figure 5

Example Query Scenario 3: 602

//Assume, again, that the following tables are created in the database    604
   CREATE TABLE Tab1 (Col1 INTEGER, Col2 INTEGER, Col3 INTEGER);
   CREATE TABLE Tab2 (Fld1 INTEGER, Fld2 INTEGER, Fld3 INTEGER);

//Assume, again, that the following real indices are created    606
   CREATE INDEX Tab1IdxCol1 ON Tab1(Col1);
   CREATE INDEX Tab2IdxFld2 ON Tab2(Fld2);

//Assume that the following query is received    608
   SELECT Col1, Col2, Fld1, Fld2
   FROM   Tab1 INNER JOIN Tab2 ON Tab1.Col1 = Tab2.Fld1 ORDER BY
   Tab1.Col1, Tab2.Fld2;

Potential Query Plan 3:

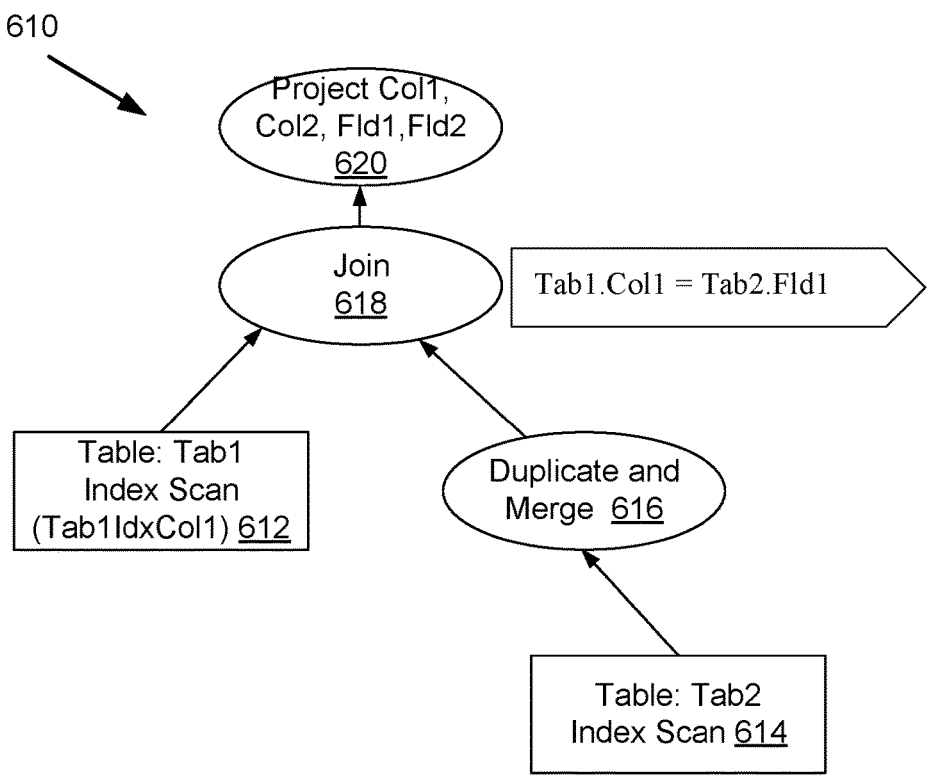

Figure 6

Example Query Scenario 4: 702

//Assume, again, that the following tables are created in the database  704
    CREATE TABLE Tab1 (Col1 INTEGER, Col2 INTEGER, Col3 INTEGER);
    CREATE TABLE Tab2 (Fld1 INTEGER, Fld2 INTEGER, Fld3 INTEGER);

//Assume, again, that the following real indices are created  706
    CREATE INDEX Tab1IdxCol1 ON Tab1(Col1);
    CREATE INDEX Tab2IdxFld2 ON Tab2(Fld2);

//Assume that the following query is received  708
    SELECT Col1, Col2, Fld1, Fld2
    FROM   Tab1 INNER JOIN Tab2 ON Tab1.Col2 = Tab2.Fld1 ORDER BY
    Tab1.Col2, Tab2.Fld1;

Potential Query Plan 4:

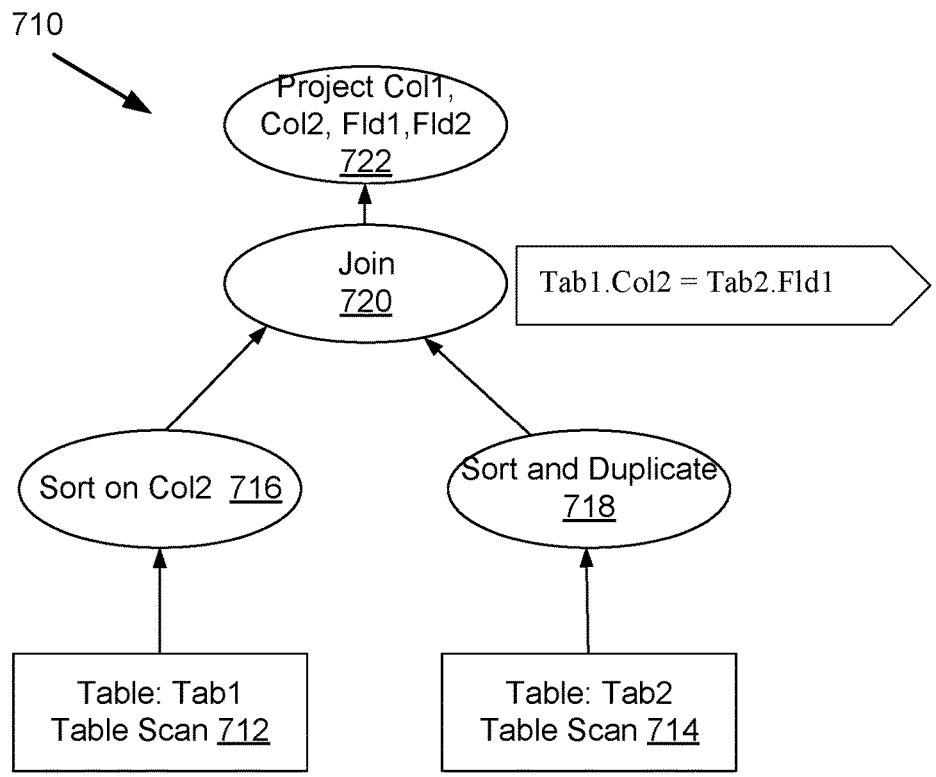

Figure 7

Example pseudo algorithm:

1. If Join exist in Query
2: NO - Stop
3: YES - If sort is requested on columns of different tables
4:     NO - Stop
5:     YES - If an Index present on left side table's column on which Order By Requested
6:         NO - Create Sort operation (Runtime) and GOTO Step #7
7:         YES - Read row from Left side table
8:             If the read value of Order By column is same as previous or does not find a previous value
9:                 YES - Get matching rows from Right side based on Join Condition
10:                     If Index used on RHS table has prefix component which part of Order By
11:                         NO: Sort matching RHS rows on column (which is part of Order By) and GOTO Step #12
12:                         YES: Store the rows in a buffer along with LHS column value and GOTO step #7
13:                 NO - Get the sorted lists stored in buffers and merge those
14:                     Send the this partial set of result to client and GOTO step #7

Figure 9

SORT OPTIMIZATION

CROSS REFERENCE TO RELATED APPLICATIONS

The present application is a continuation of U.S. patent application Ser. No. 17/104,710, filed Nov. 25, 2020, titled "Sort Optimization", the entirety of which is hereby incorporated by reference.

FIELD OF INVENTION

The present disclosure relates to query systems. Specifically, the present disclosure relates to providing optimization and efficient processing of queries involving a set operation and a sort.

BACKGROUND

Over the years, the cost of storing data has been reduced as memory technologies have advanced. This reduction in the cost of storing data coincides with a trend to store more data in databases as well as a trend to store data in larger databases. With a growth in the size of databases, the need for efficient methods and systems for locating and retrieving, or otherwise accessing, data therefrom is of increasing importance. Accordingly, what is needed are efficient or responsive methods for query processing and optimization.

When a query contains a set operation, such as a join, and a sort is desired on columns of different tables, then, currently, the result must be sorted by way of employing a sort strategy on the resultant rows of the set operation. This step may be time consuming and computationally costly, especially, when the resultant rows of the set operation are large in number. Hence, the time it takes for user to receive a first resultant row is presently, directly proportional to amount resultant rows which need be sorted. Therefore, methods and systems for query processing that reduce the time before receiving a first resultant row are desirable.

SUMMARY

In general, an innovative aspect of the subject matter described in this disclosure may be embodied in methods that include receiving, using one or more processors, a query including a set operation and a sort operation, where the set operation includes a first data structure and a second data structure and the sort operation requests a result set that is sorted based on a column or attribute of the first data structure and a column or attribute of the second data structure; generating, using the one or more processors, a query plan in which a sort operation occurs prior to the set operation; determining, using the one or more processors, a first, partial set of one or more resultant rows responsive to the query; sending, using the one or more processors, the first, partial set of one or more resultant rows responsive to the query to a client; determining, using the one or more processors, a second, partial set of one or more resultant rows responsive to the query; and sending, using the one or more processors, the second, partial set of one or more resultant rows responsive to the query to the client.

According to yet other innovative aspects of the subject matter described in this disclosure, one or more systems comprising a processor; and a memory storing instructions that, when executed, cause the system to perform one of the methods described above.

Other implementations of one or more of these aspects include corresponding systems, apparatus, and computer programs, configured to perform the actions of the methods, encoded on computer storage devices. These and other implementations may each optionally include one or more of the following features.

The features may include determining the first, partial set of one or more resultant rows responsive to the query includes: buffering a first portion of the first, partial set of one or more resultant rows; and merging a second portion of the first, partial set of one or more resultant rows to the first portion of the first, partial set of one or more resultant rows in the buffer, where the first portion and second portion of the first, partial set of one or more resultant rows have a common value in the column or attribute of the first data structure on which the sort operation is requested. The features may include reading a row from the first data structure determining the row from the first data structure has a different value in the column or attribute of the first data structure on which the sort operation is requested; responsive to determining the row from the first data structure has different value in the column or attribute of the first data structure and after merging the second portion of the first, partial set of one or more resultant rows to the first portion of the first, partial set of one or more resultant rows in the buffer, sending the first portion and second portion of the first, partial set of one or more resultant rows, as the first, partial set of one or more resultant rows; and clearing the buffer. The features may include determining, using the one or more processors, whether the column or attribute of the first data structure is has an index of the first data structure defined on it; and determining, using the one or more processors, whether the column or attribute of the second data structure is has an index of the second data structure defined on it. The features may include that the first data structure and the second data structure are relational tables. The features may include that the first data structure and the second data structure are non-relational data structures. The features may include that a full result set may include the first, partial set of one or more resultant rows responsive to the query, and the second, partial set of one or more resultant rows responsive to the query. The features may include that the query uses structured query language (SQL). The features include that the set operation is one or more of an inner join, left outer join, right outer join, full outer join and cross join.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 4 is an example of a prior art query scenario.

FIG. 5 is an example query scenario for sort optimization using split and merge according to one embodiment.

FIG. 6 is another example query scenario for sort optimization using split and merge according to one embodiment.

FIG. 7 is yet another example query scenario for sort optimization using split and merge according to one embodiment.

FIG. 9 is an example pseudo algorithm for sort optimization using split and merge according to one embodiment.

DETAILED DESCRIPTION

Figure 1:
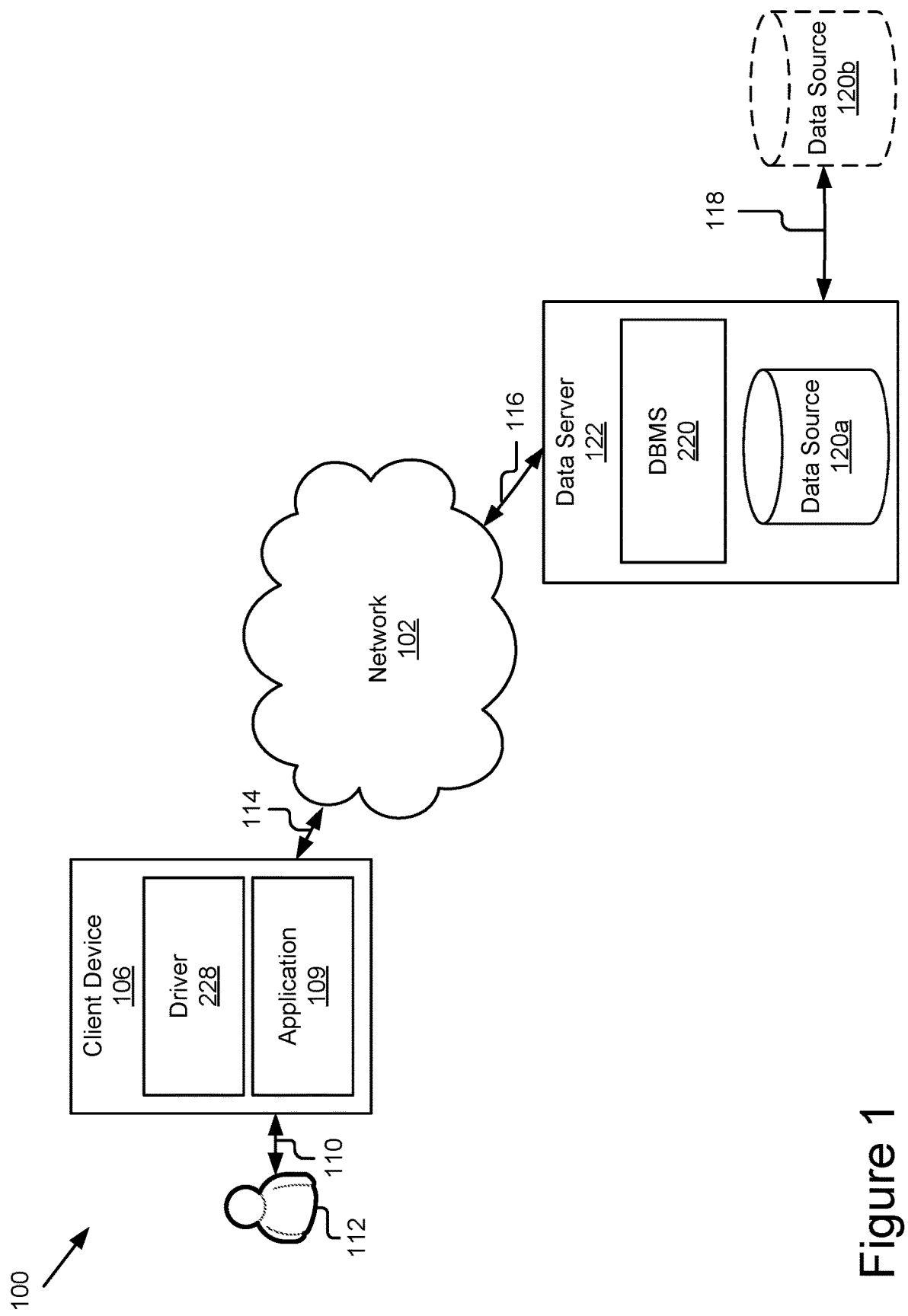
FIG. 1 is a block diagram illustrating an example query system according to one embodiment.

FIG. 1 is a block diagram illustrating an example system 100 for processing a query according to one embodiment. The illustrated system 100 includes a client device 106 and a data server 122, which are communicatively coupled via a network 102 for interaction with one another. For example, the client devices 106 may be coupled to the network 102 via signal line 114. The data server 122 may be coupled to the network 102 via signal line 116. In some embodiments, the client device 106 may be accessed by a user 112 as illustrated by line 110. The system 100 includes one or more data sources (referred to individually as data source 120 and collectively as databases 120). The one or more databases may be included in the data server 122 as illustrated by data source 120a, coupled to the data server 122 as a direct access storage (DAS) illustrated by data source 120b and line 118, coupled to the data server 122 via the network 102 as a network accessible storage (NAS) (not shown), or a combination thereof.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation, Comma Separated Values (CSV), etc. In addition, all or some of links can be encrypted using conventional encryption technologies, for example, the secure sockets layer (SSL), Secure Hypertext Transfer Protocol (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client device 106 is a computing device having data processing and communication capabilities. While FIG. 1 illustrates one client device 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, input devices (e.g. mouse, keyboard, camera, sensors, etc.) firmware, operating systems, drivers, various physical connection interfaces (e.g., USB, HDMI, etc.). The client devices 106 may couple to and communicate with one another and the other entities (e.g. data server 122) of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one client device 106 is depicted in FIG. 1 for clarity and convenience, the system 100 may include any number of client devices 106. In addition, the any number of client devices 106 may be the same or different types of computing devices. In the depicted embodiment, the client device 106 includes an instance of a driver 228 and an application 109.

The application 109 may be storable in a memory and executable by a processor of a client device 106. In one embodiment, the application 109 requests and uses data which is stored by one or more data sources 120. The application 109 may be any application written in any language. For example, the application 109 may be one of a Java, a C, a C++ and Microsoft.net application. It should be recognized that the preceding are merely examples of applications 109 and others exist.

The driver 228 may be storable in a memory and executable by a processor of a client device 106. The driver 228 may refer to a traditional driver, e.g. a JDBC driver or ODBC driver, or a client library, e.g. an HTTP client library to communicate using REST protocols. In one embodiment, the driver 228 is a standards-based driver. For example, in some embodiments, the driver 228 uses one or more of the open database connectivity (ODBC), Java database connectivity (JDBC) and REST protocols. In one embodiment, the driver 228 communicates with the database management system (DBMS) 220 to expose and provide the application 109 access to data stored by one or more databases 120.

The data server 122 may include one or more computing devices having data processing, storing, and communication capabilities. For example, the data server 122 may include one or more hardware servers, server arrays, storage devices, systems, etc., and/or may be centralized or distributed/cloud-based. In some implementations, the data server 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the data server 122 includes the DBMS 220 module. The DBMS 220 module may be storable in a memory and executable by a processor of a data server 122 to provide access to data stored by a data source 120. For example, in one embodiment, the DBMS 220 provides an application 109 using a driver 228 access to data stored by a data source 120 via the network 102.

It should be recognized that while the examples and description herein may refer to embodiments that use the Structured Query Language (SQL), which is a relational DBMS. Other relational DBMS and non-relational (e.g. NoSQL) DBMS exist and the disclosure herein may be adapted and applied to a DBMS that does not use SQL. A data source 120 may be stored on one or more non-transitory computer-readable mediums for storing data.

It should be understood that the system 100 illustrated in FIG. 1 is representative of an example query system according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems may be included. For example, in one embodiment, the application 109, driver 228, the DBMS 220 and data source 120 may be included in a single computing device (not shown).

Figure 2:
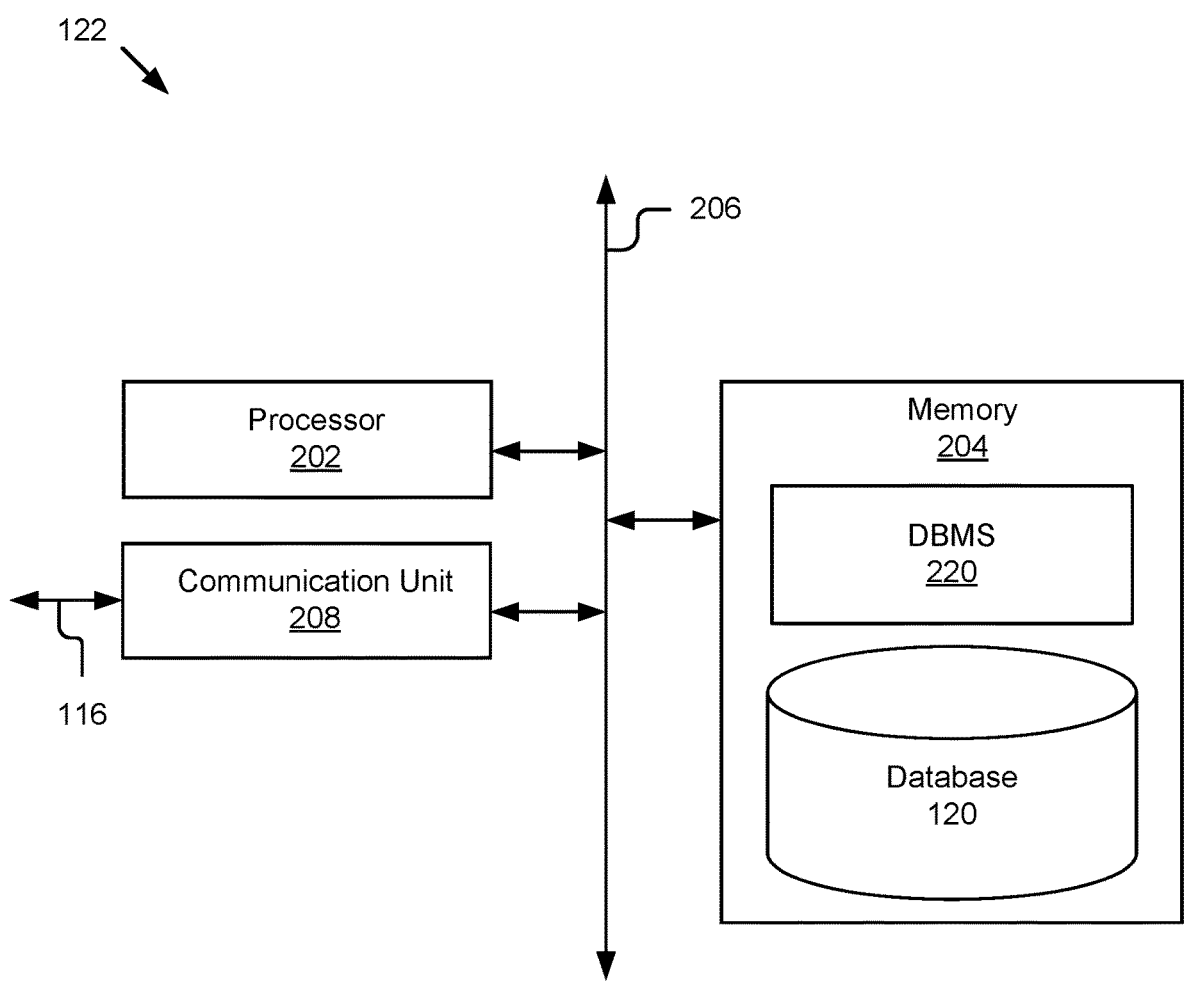
FIG. 2 is a block diagram illustrating an example data server according to one embodiment.

FIG. 2 is a block diagram of an example data server 122 according to one embodiment. The data server 122, as illustrated, may include a processor 202, a memory 204 and a communication unit 208, which may be communicatively coupled by a communications bus 206. The data server 122 depicted in FIG. 2 is provided by way of example and it should be understood that it may take other forms and include additional or fewer components without departing from the scope of the present disclosure. For example, while not shown, the data server 122 may include input and output devices (e.g., one or more of a display, a keyboard, a mouse, touch screen, speakers, microphone, camera, sensors, etc.), various operating systems, sensors, additional processors, and other physical configurations.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the data server 122 including, for example, the memory 204 and communication unit 208.

The memory 204 may store and provide access to data to the other components of the data server 122. In some implementations, the memory 204 may store instructions and/or data that may be executed by the processor 202. For example, in the illustrated embodiment, the memory 204 may store the DBMS 220 module. The memory 204 is also capable of storing other instructions and data, including, for example, an operating system, hardware drivers, other software applications, databases, etc. The memory 204 may be coupled to the bus 206 for communication with the processor 202 and the other components of the data server 122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some embodiments, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive (HDD), an optical disk drive (CD, DVD, Blu-ray™, etc.). It should be understood that the memory 204 may be a single device or may include multiple types of devices and configurations. For example, in one embodiment, the data source 120 may be stored on an HDD and portions may be read into RAM for processing by the processor 202. In one embodiment, the memory 204 includes the DBMS 220 and a data source 120.

The bus 206 can include a communication bus for transferring data between components of a data server 122 and/or between computing devices (e.g. between the data server 122 and the client device 106), a network bus system including the network 102 or portions thereof, a processor mesh, a combination thereof, etc. In some implementations, the DBMS 220, its sub-components and various other software operating on the data server 122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

Example Database Management System (DBMS) 220 Module

Figure 3:
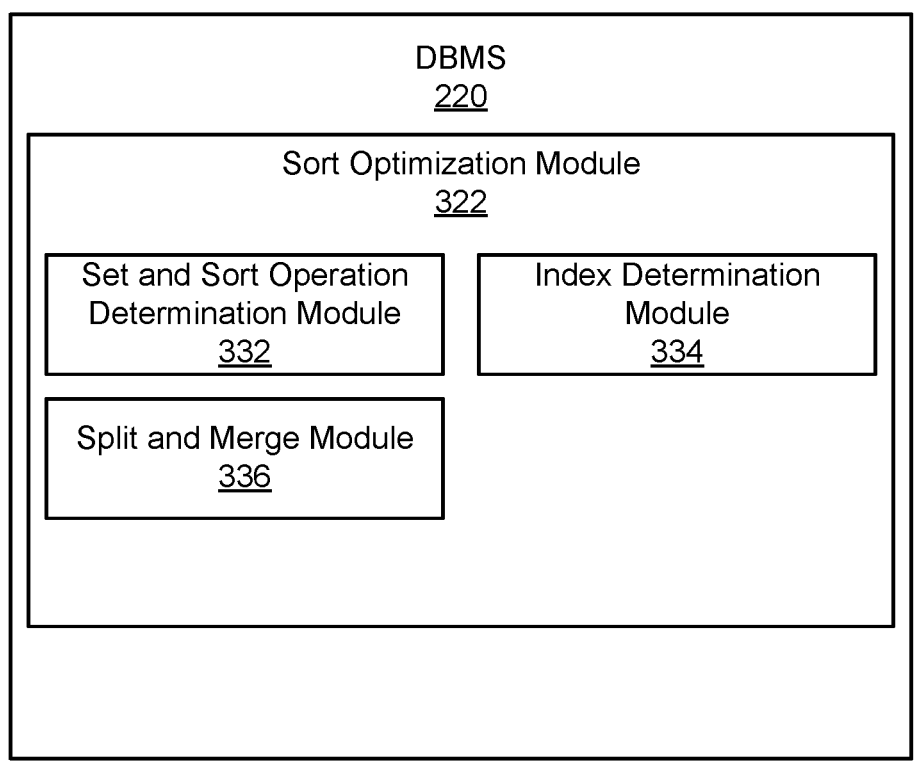
FIG. 3 is block diagram illustrating an example database management system according to one embodiment.

Referring now to FIG. 3, the DBMS 220 module is shown in more detail according to one embodiment. FIG. 3 is a block diagram of the DBMS 220 module included in a data server 122 according to one embodiment.

The DBMS 220 provides access to data stored by a database 120. For example, in one embodiment, the DBMS 220 provides an application 109 using a driver 228 access to data stored by a data source 120 via the network 102. In one embodiment, the DBMS 220 receives a query requesting access to and/or manipulation of data, parses the query (e.g. to determine permissions, semantics, syntax, etc.), generates and optimizes a query plan for accessing and/or manipulating the data as requested and executes the plan to access and/or manipulate the requested data.

As the number of databases, the size of databases and the number of queries made on a database increase, the efficiency of query processing and, therefore, the optimization of the query plan becomes increasingly important. The present disclosure provides a DBMS 220 for processing one or more of a set operation type query, which may provide improved processing compared to current DBMS systems.

In the illustrated embodiment, the DBMS 220 includes a sort optimization module 322. However, it should be recognized that, according to some embodiments, the sort optimization module 322 or its features and functionality may be omitted from the DBMS 220. It should also be recognized that the module 322 or submodules 332, 334, and 336 comprised in the DBMS 220 module may not necessarily all reside on the same data server 122. In one embodiment, the module 322 or submodules 332, 334, 336 and/or their functionality are distributed across multiple data servers 122.

The sort optimization module 322 includes code and routines for generating and selecting a split and merge query plan for a set operation type query. As described below, there are two sub-types of split and merge—"sort and merge" and "duplicate and merge"—that may be applied depending on the query (e.g. which columns or attributes are being sorted) and the presence or absence of one or more indices (e.g. whether the sorted columns or attributes have indices). In one embodiment, the sort optimization module 322 is a set of instructions executable by the processor 202. In another embodiment, the sort optimization module 322 is stored in the memory 204 and is accessible and executable by the processor 202. In either embodiment, the sort optimization module 322 is adapted for cooperation and communication with the processor 202, other components of the data server 122 and other components of the DBMS 220 module. The features and functionality of the sort optimization module 322 are discussed in detail below with reference to FIGS. 5-9.

Example Sort Optimization Module 322

Referring now to FIG. 4, a sort optimization module 322 is shown in more detail according to one embodiment. FIG. 4 is a block diagram illustrating an example of a sort optimization module 322 according to one embodiment.

The sort optimization module 322 generates and selects a sort and merge query plan responsive to receiving a set operation type query, which may occasionally be referred to simply as a "set operation query" herein. A set operation query is a query type that includes one or more set operators. Generally, a set operation takes data from different source tables and groups the data. Examples of set operators may include, but are not limited to joins, such as INNER, LEFT OUTER, RIGHT OUTER, FULL OUTER and CROSS joins.

The description herein applies to any Relational Query (Relational DB) or Request (Non-Relational DB) which involves using more than one data structure, whether a Table (Relational DBs) or Object (Non-Relational DBs), and requests a Sort on field values or column values of more than one data structure and may produce results faster manner using less resources. In one embodiment, the set operation query is a Structured Query Language (SQL) query. For example, the types joins listed in the paragraph above refer to SQL set operators. However, it should be recognized that SQL is merely one embodiment and referred to herein for clarity and convenience. It should further be recognized that the teachings herein may be adapted and applied to other query languages and databases (whether relational or non-relational) without departing from this disclosure.

To better understand the differences and advantages of the sort optimization module 322 over existing systems, it is useful to compare its split and merge query processing to that of existing systems. Therefore, Example Query Scenario 1 402 of FIG. 4 is provided to illustrate a first example query scenario, and describes how an existing system responds to such a query. By way of contrast FIGS. 5-7 illustrate various example query scenarios (query scenarios 2-4) and how the split and merge query system responds to such queries according to some embodiments.

The example scenarios are selected for clarity and convenience. For example, the example scenarios 502, 602, 702 refer to SQL queries, join two tables, and use a one-column index. However, it should be recognized that these example scenarios 502, 602, 702 are merely examples provided for clarity and convenience and neither limit this disclosure nor its application to other scenarios. For example, the disclosure herein may be applied to query scenarios having one or more of a different number of tables, a different number of set operations, a different number of tables associated with an index, table(s) having different order(s) of indices, different indices (e.g. including a composite index on two or more columns), different data types in the tables, etc. than those described in the example scenarios 502, 602, 702 without departing from the disclosure herein.

Referring now to FIG. 3, in some embodiments, the sort optimization module 322 includes a set and sort operations determination module 332, an index determination module 334, and a split and merge module 336. It should be recognized that the modules 332, 334, 336 comprised in the sort optimization module 322 may not necessarily all reside on the same data server 122. In one embodiment, the modules 332, 334, 336 and/or their functionality are distributed across multiple data servers 122.

A sub-module 332/334/336 of the sort optimization module 322 may include code and routines for providing the functionality associated with the sub-module as described below. In some embodiments, a sub-module 332/334/336 includes a set of instructions executable by the processor 202. In some embodiments, a sub-module 332/334/336 is stored in the memory 204 and are accessible and executable by the processor 202. Regardless, a sub-module 332/334/336 is adapted for cooperation and communication with the processor 202, other components of the data server 122 and other components (e.g. other sub-modules) of the sort optimization module 322.

The set and sort operations determination module 332 receives a query and determines whether the query includes a set operation and a sort operation.

The set and sort operations determination module 332 determines whether the received query includes a set operation. In one embodiment, the set and sort operations determination module 332 determines whether the query includes a join. For example, the set and sort operations determination module 332 receives a query and determines whether the query includes an inner join, left outer join, right outer join, full outer join, or cross join.

The set and sort operations determination module 332 determines whether the received query includes a sort operation. In one embodiment, the set and sort operations determination module 332 determines whether the sort operation is a multi-table sort operation, which sorts columns/fields/object values from multiple tables. For example, the set and sort operations determination module 332 receives a query and determines whether the query sorts based on column x of one table and column y from another table.

In one embodiment, when the query includes a set operation and a sort based on columns from two or more tables, the query is passed to, or obtained by, the index determination module 334. In one embodiment, when the query lacks a set operation or the sort is not based on columns from two or more tables, the query is processed by a means outside the scope of this description. In the example query scenarios of FIGS. 5-7, the query 508, 608, 708 includes an inner join, and, therefore, the set and sort operations determination module 332 determines that the query 508, 608, 708 includes a set operation. Additionally, in the example query scenarios of FIGS. 5-7, the query 508, 608, 708 includes an Order By that sorts based on column values of Tab1 and field values of Tab2, and, therefore, the set and sort operations determination module 332 determines that the query 508, 608, 708 includes a multi-table sort operation.

Set operation queries, particularly those including a join, may be complex and computationally and time intensive to execute. Index structures may be utilized to increase efficiency, since index scans are generally faster and less resource intensive than table scans. An index scan reads the data from table in sorted order on which the index is defined. However, a table does not always have an index on the column(s) on which the sort is requested. Therefore, the index determination module 334 determines whether the received query, which includes a set operation, sorts based on one or more indexed columns.

For the sake of simplicity, consider a query that includes a set operation and sorts based on two columns from two tables. For such queries, there are three potential types of index scenarios—one of the two sorted columns from two tables has an index, both of the two sorted columns from two tables have indices, and neither of the two sorted columns from two tables has an index. These three index scenarios are described herein. Query Scenario 2 502 of FIG. 5 describes a query 508 that sorts (i.e. ORDER BY in the illustrated example) on two columns (i.e. Tab1.Col1 and Tab2.Fld3) from two tables (i.e. Tab1 and Tab2), and one of the columns (i.e. Tab1.Col1) has an index as illustrated at 506. Query Scenario 3 602 of FIG. 6 describes a query 608 that sorts (i.e. ORDER BY in the illustrated example) on two columns (i.e. Tab1.Col1 and Tab2.Fld2) from two tables (i.e. Tab1 and Tab2), and both of the columns (i.e. Tab1.Col1 and Tab2.Fld2) have indices as illustrated at 606. Query Scenario 4 702 of FIG. 7 describes a query 708 that sorts (i.e. ORDER BY in the illustrated example) on two columns (i.e. Tab1.Col2 and Tab2.Fld1) from two tables (i.e. Tab1 and Tab2), and neither of those columns have indices as illustrated at 706.

The index determination module 334 determines whether the query sorts on an indexed column. In one embodiment, the index determination module 334 determines whether the query sorts on an indexed, prefix column. For example, assume the sort is ordered by Tab1.Col1, Tab2.Fld2, where Fld2 has an index (e.g. see 506, 606,706), but Fld1 does not have an index defined for Tab2; in one embodiment, the index determination module 334 determines that the query sorts on columns from two tables (Tab1 and Tab2) where columns from one table (Tab1.Col1) have a prefix index. Therefore, the query is processed similar to that of Example query scenario 502.

The index determination module 334 adds an index scan node to the query plan responsive to determining that a sort is performed on an indexed column. In one embodiment, the index determination module 334 adds an index scan node to the query plan responsive to determining that a sort is performed on a column or set of columns with an index prefix.

In one embodiment, when the index determination module 334 determines no index exists, the index determination module 334 generates a sort operation at runtime. For example, referring to example query scenario 4 of FIG. 7, the query sorts on Col2 and Fld1, neither of which are an index in Tab1 or Tab2, respectively. Therefore, in one embodiment, the index determination module 334 determines that Tab1 is the left-side table (similar to query plan 710), and generates a sort operation on Col2.

The split and merge module 336 generates and executes a query plan. In one embodiment, the query plan generated and executed by the split and merge module 336 is based on the query including a set operation (e.g. a join) and a sort on columns from multiple tables, and may vary based on the presence, or absence, of a table index on the columns being sorted in the received query. In one embodiment, the split and merge module 336 determines a cost associated with the query plan. For example, the split and merge module 336 determines whether a query plan including the sort and merge, or duplicate and merge, strategy results in poor runtime, and, if not, the query plan is generated and may be executed.

To better understand the differences and benefits of the sort and merge strategy described herein, prior art Example Query Scenario 1 402 is described with reference to FIG. 4. In Example Query Scenario 1 402, two tables (Tab1 and Tab2) are created 404 and a first order (i.e. one column) index is created for each of the two tables 406, such that Tab1 has an index on Col1 and Tab2 has an index on Fld2. In Example Query Scenario 1 402, the query 508 "SELECT Tab1.Col1,Tab2.Fld1 From Tab1 INNER JOIN Tab2 ON Tab1.Col2=Tab2.Fld1 order by Tab1.Col1,Tab2.Fld1" is received. Because the sort (i.e. ORDER BY) is desired on columns from two tables (i.e. Tab1.Col1 and Tab2.Fld2), existing systems generate a query plan 410 in which the set operation (i.e. the join 416) and the sort (i.e. Sort by Col1,Fld1 418) is performed on the resultant rows of that set operation.

As mentioned, set operations, such as joins, can be time and resource intensive, particularly when the resultant rows are large in number. When a query plan such as 410 is applied, no results are provided to a user responsive to the query until the join is performed and then sorted. Hence, the time it takes for a user to receive a first resultant row, in an existing system, is directly proportional to amount resultant rows which need be sorted.

By contrast, the sort optimization strategy described herein may improve response time drastically and reduces resource utilization. The split and merge module 336 "pushes" the sort operation down the query plan tree and performs "N" smaller sort operations rather than one larger sort operation and produces "N" sub-results where each sub-result represents part of the whole and correct result set. This sort optimization strategy is illustrated, by way of example, with reference to the example query scenario 502, 602, 702 of FIGS. 5-7 generate query plans 510, 610, 710 sort prior to the join and may provide a first (e.g. partial) set of resultant rows more quickly.

Referring now to FIGS. 4 and 5, when comparing the query plan 410 (prior art) to the query plan 510 generated as described herein, it should be recognized that the sort 418 is moved to a level down, to the sort and merge 516, just above right-side table scan 514. Therefore, for each row from the left-side table (column value, Tab1.Col1), the split and merge module 336 scans the right-side table and fetches matching rows (i.e. rows satisfying the join condition). After the rows are fetched, the split and merge module 336 sorts the rows by column Tab2.Fld3 and stores the sorted rows, in a temporary buffer, until the split and merge module 336 obtains a different column value (Tab1.Col1) from left-side table. Responsive to obtaining a different value for Tab1.Col1, the split and merge module 336 send the rows present in buffer to the node above (i.e. node 520) as the first partial result set. Note that, this strategy yields correct results, since row from left-side table is already read in sort order of Tab1.Col1, and because of index scan and rows of right-side table are sorted on column, Tab2.Fld3 once stored in buffer. Hence, the is in the sorted order of Tab1.Col1, Tab2.Fld3.

To further clarify, consider a below working example demonstrating the sort of two columns from two tables where one of the columns has an index, according to one embodiment. Assume query 508, which is "SELECT Col1, Col2, Fld1, Fld3 FROM Tab1 INNER JOIN Tab2 ON Tab1.Col2=Tab2.Fld1 ORDER BY Tab1.Col1, Tab2.Fld3," and tables Tab1 and Tab2 are as follows:

| Tab1 | | | Tab2 | | |
| --- | --- | --- | --- | --- | --- |
| RID | Col1 | Col2 | RID | Fld1 | Fld3 |
| R1T1 | 5 | 4 | R1T2 | 3 | 6 |
| R2T1 | 5 | 3 | R2T2 | 4 | 8 |
| R3T1 | 10 | 5 | R3T2 | 3 | 4 |
| R4T1 | 20 | 1 | R4T2 | 4 | 6 |
| R5T1 | 20 | 4 | R5T2 | 1 | 12 |

Please note that, while Tab1, above, is shown as being ordered on Col1, it need not be. Since Col1 has an index (see 506), performing an index scan on Col1 reads the data from Tab1 in sorted order even if the table does not store the data in sorted order on Col1. Please note that the abbreviated format RxTy refers to Rowid x of Table y.

Based on the query execution plan 510, table Tab1 is read first which is on left side, so R1T1 is read first, and the value of Col1 and Col2 is sent across Right table of the join. At the right hand side (RHS), the split and merge module 336 and a node to the query plan and later performs a table scan to read rows and evaluate join condition (Col2=Fld1) and this results in reading R2T2 and R4T2 rows. These rows are then sorted by Fld3 column value and kept in a buffer by the split and merge module 336. The split and merge module 336 also tracks the value of Col1 which is "5" in this case. Therefore, after first iteration, a buffer stores the below according to one embodiment:

R1T1 R4T2 [5, 4, 4, 6]
R1T1 R2T2 [5, 4, 4, 8]

Next, the split and merge module 336 reads the second row from Tab1 and sends the values of R2T1 to RHS of the join. At the RHS, the split and merge module 336 compares the value of Col1 (which is part of R2T1) with the previous value of Col1 which was stored earlier (i.e. 5 in this example). Since, the value matches, the split and merge module 336 merges the new set of matching rows from RHS with the existing buffer. In this case, this results in two rows from RHS, which are R1T2 and R3T3. Therefore, after the second iteration, the buffer stores the below (after sort on Fld3).

R2T1 R3T2 [5, 3, 3, 4]
R1T1 R4T2 [5, 4, 4, 6]
R2T1 R1T2 [5, 3, 3, 6]
R1T1 R2T2 [5, 4, 4, 8]

Next, the split and merge module 336 reads the third row from Tab1 on the left-hand side (LHS). The split and merge module 336 passes the values 10,5 for Col1 and Col2, of R3T1 to RHS. The split and merge module 336 compares the stored value (i.e. 5) of Col1 with new value which is 10 in Col1 of R3T1. Since, the values are different, the split and merge module 336 sends a first set of partial result to the client and flushes the buffer for re-use. Hence, a client begins to see a (partial) result, and more quickly than using the prior art method described with reference to FIG. 4. After a third iteration, the split and merge module 336 empties the buffer, since there is no match in RHS. In other words, Tab2 does not have a row in which Fld1 has a value of 5.

Next, the split and merge module 336 reads the fourth row (R4T1) from the LHS, for this row, there is one matching row on the RHS. Therefore, after the fourth iteration, the buffer includes:

R4T1 R5T2 [20, 1, 1, 12]

Next, the split and merge module 336 reads the fifth row from the LHS. At the RHS, the split and merge module 336 compares the value of Col1 (which is part of R5T1) with the previous value of Col1 which was stored earlier (i.e. 20 in this example). Since, the value (i.e. 20) matches the Col1 value of R5T1, the split and merge module 336 merges appends the new set of rows to the existing buffer and sort them on Fld3. For R5T1 row, there are two matches on RHS. Accordingly, after the fifth iteration, the buffer includes:

R5T1 R4T2 [20, 4, 4, 6]
R5T1 R2T2 [20, 4, 4, 8]
R4T1 R5T2 [20, 1, 1, 12]

Since, there are no more rows on LHS, the split and merge module 336 sends the result stored in buffer to client, as the last part of the final result.

Below is the result which client receives in the order of Col1, Fld3.

R2T1 R3T2 [5, 3, 3, 4]
R1T1 R4T2 [5, 4, 4, 6]
R2T1 R1T2 [5, 3, 3, 6]
R1T1 R2T2 [5, 4, 4, 8]
R5T1 R4T2 [20, 4, 4, 6]
R5T1 R2T2 [20, 4, 4, 8]
R4T1 R5T2 [20, 1, 1, 12]

Please note that the above example was just used to illustrate the working model to improve the response time. In reality, when the result set is very large, it may take a significant amount of time to perform the sort and to return results to user. Where the tables (e.g. Tab1 and Tab2) are large or where the result set is large, the system and method described herein may provide a significant reduction in the amount of time before a client sees a result, even though the result is partial initially.

Referring now to FIG. 6, Query Scenario 3 602 describes a query 608 that sorts (i.e. ORDER BY in the illustrated example) on two columns (i.e. Tab1.Col1 and Tab2.Fld2) from two tables (i.e. Tab1 and Tab2), and both of the columns (i.e. Tab1.Col1 and Tab2.Fld2) have indices as illustrated at 606. When comparing the query plan 610 to that of 510 discussed above, one may note the following:

a. Join condition is using same column as first column of required sort (Col1)

b. There is an available index on second column of Tab2 specified in Order By c. Sort and Merge operation is replaced by "Duplicate and Merge", as we get RHS rows in already sorted order To understand "Duplicate and Merge" operation and how it returns correct results, consider query 608, which is query is "SELECT Col1, Col2, Fld1, Fld2 FROM Tab1 INNER JOIN Tab2 ON Tab1.Col1=Tab2.Fld1 ORDER BY Tab1.Col1, Tab2.Fld2, and the below tables and data:

| Tab1 | | | Tab2 | | |
|---|---|---|---|---|---|
| RID | Col1 | Col2 | RID | Fld1 | Fld2 |
| R1T1 | 5 | 4 | R1T2 | 5 | 4 |
| R2T1 | 5 | 3 | R2T2 | 10 | 2 |
| R3T1 | 10 | 5 | R3T2 | 5 | 6 |

Again, while the rows of Tab1 are already in order according to Col1 value, this need not be the case in order for the split and merge module 336 to function, as an index scan would read rows from Tab1 in order according to their Col1 value. This example is merely simplified so that the rows of Tab1 may be taken in row-order (i.e. R1 then R2, etc.) rather than using an example where the row number is out of sequence in order to read the col1 values in order.

The split and merge module 336 reads the first row, R1T1, and sends it to the RHS, here, according to join condition, two rows are matching (R1T2 and R3T2). These rows are kept in buffer by the split and merge module 336. Therefore, after first iteration, the buffer (already read in sorted order) includes:

R1T1 R1T2 [5, 4, 5, 4]
R1T1 R3T2 [5, 4, 5, 6]

Now, the second row from LHS is read and sent to RHS, by the split and merge module 336. The split and merge module 336 compares the value of Col1 (which is part of R2T1) with the previous value of Col1 which was stored earlier (i.e. 5 in this example). Since, the value which would participate in evaluating join condition is same, the resultant rows from RHS remain same. Therefore, the split and merge module 336 need not read (i.e. scan) the RHS table again. The split and merge module 336 may simply apply a "Duplicate and Merge" approach, where it duplicates the previous resultant rows from the RHS and merges with the existing rows in the buffer based on the value of Tab2.Fld1. Therefore, after a second iteration, the buffer includes:

R1T1 R1T2 [5, 4, 5, 4]
R2T1 R1T2 [5, 3, 5, 4]
R1T1 R3T2 [5, 4, 5, 6]
R2T1 R3T2 [5, 3, 5, 6]

Next, the split and merge module 336 reads the third row (R3T1) from the LHS table. The split and merge module 336 compares the value of Col1 (i.e. 10) with the previous value of Col1 which was stored earlier (i.e. 5 in this example). Since, the value of Col1 (i.e. 10) differs from previous one (i.e. 5), the split and merge module 336 send the rows in the buffer to the client, clears the buffer. The split and merge module 336, at the RHS evaluates the join condition, and buffers the resulting row(s), which include:

R3T1 R2T2 [10, 5, 10, 2]

Since, there are no more rows on LHS, the split and merge module 336 sends the result stored in buffer to client, as the last part of the final result. Accordingly, in total, the below 5 rows are sent to clients in two phases.

R1T1 R1T2 [5, 4, 5, 4]
R2T1 R1T2 [5, 3, 5, 4]
R1T1 R3T2 [5, 4, 5, 6]
R2T1 R3T2 [5, 3, 5, 6]
R3T1 R2T2 [10, 5, 10, 2]

Referring now to FIG. 7, Query Scenario 4 702 of FIG. 7 describes a query 708 that sorts (i.e. ORDER BY in the illustrated example) on two columns (i.e. Tab1.Col2 and Tab2.Fld1) from two tables (i.e. Tab1 and Tab2), and neither of those columns have indices as illustrated at 706. When comparing the query plan 710 to that of 510 discussed above, one may note the following:

a. LHS Column (Col2) on which sort is required does not have any index defined on it.

b. RHS Column (Fld1) on which sort is required does not have any index defined on it.

c. The split and merge module 336 generates a Sort node on top of Tab1 (LHS) scan.

d. Sort and Merge is performed on RHS (on top of Tab2).

In example query scenario 4, since Col2 does not have any index defined on it, the split and merge module 336 performs a sort operation 716 on Col2 before starting to read from the LHS. Once the sort 716 is performed on Tab1 of the LHS, the query is processed similar to that of query scenario 2 of FIG. 5.

Example Methods

Figure 8:
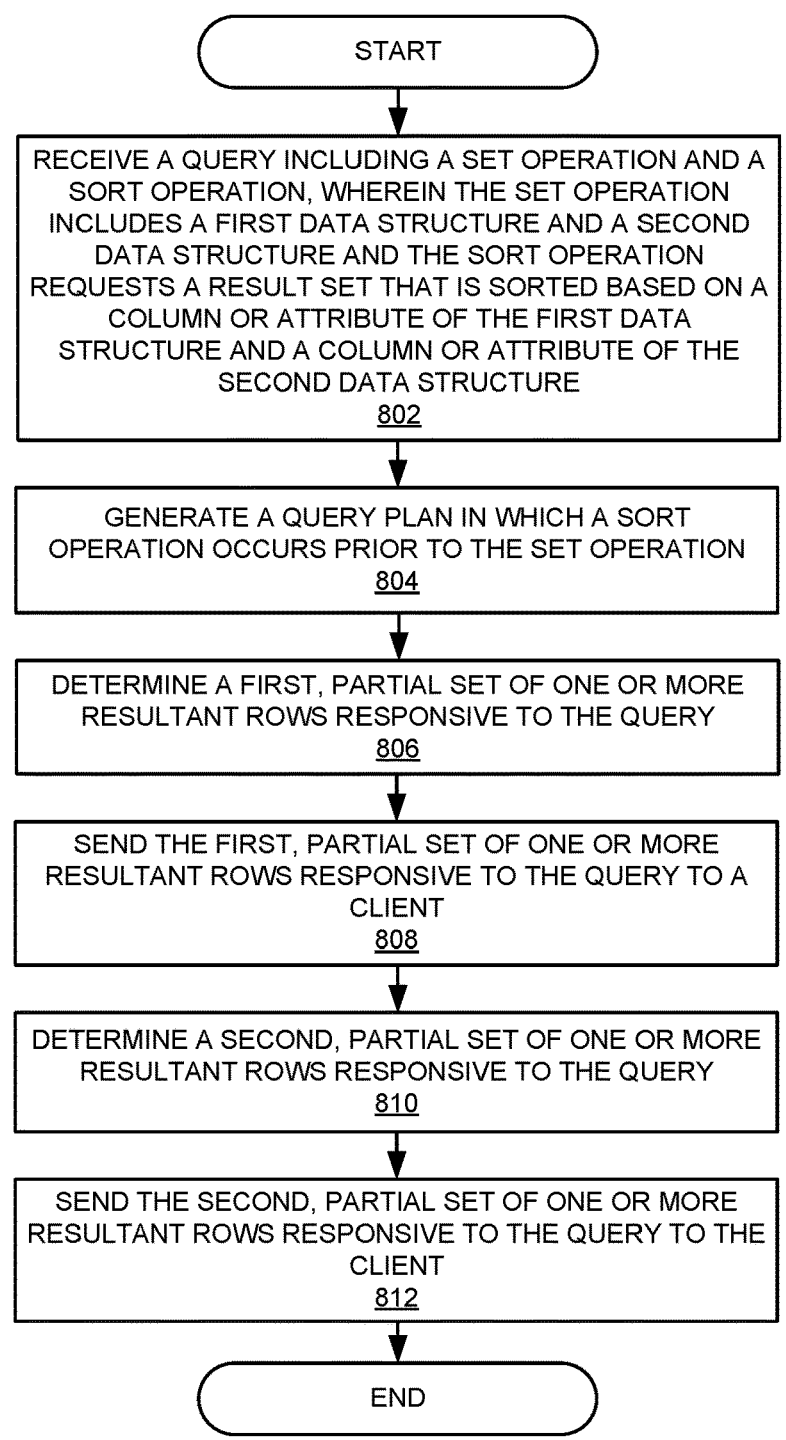
FIG. 8 is a flowchart of an example method for sort optimization using split and merge according to one embodiment.

FIG. 8 depicts method 800 performed by the system described above in reference to FIGS. 1-3. The method 800 begins at block 802. At block 802, the sort optimization module 322 receives a query including a set operation and a sort operation, wherein the set operation includes a first data structure and a second data structure and the sort operation requests a result set that is sorted based on a column or attribute of the first data structure and a column or attribute of the second data structure. At block 804, the sort optimization module 322 generates a query plan in which a sort operation occurs prior to the set operation. At block 806, the sort optimization module 322 determines a first, partial set of one or more resultant rows responsive to the query. At block 808, the sort optimization module 322 sends the first, partial set of one or more resultant rows responsive to the query to a client. At block 810, the sort optimization module 322 determines a second, partial set of one or more resultant rows responsive to the query. At block 812, the sort optimization module 322 sends the second, partial set of one or more resultant rows responsive to the query to the client, and the method 800 ends.

Referring now to 9, an example pseudo algorithm 900 executed by the sort optimization module 322 is described according to one embodiment. However, it should be recognized that this is merely one embodiment and other embodiments implementing different pseudo algorithms for processing a sort (e.g. an Order By) and set operation (e.g. a Join) are contemplated and covered by the disclosure herein.

In example pseudo algorithm 900, the set and sort operation module 332 determines if the query includes a join (line 1). When the query does not include a join (line 2), the pseudo algorithm ends. When a join exists in the query (line 3), the pseudo algorithm continues, and the set and sort operations determination module 332 determines whether a sort is requested on columns for different tables. When a sort is not requested on columns from different tables (line 4), the pseudo algorithm ends. When a sort is requested on columns from different tables (line 5), the pseudo algorithm continues, and the index determination module 334 determines whether an index is present on the column on which the left-side table rows are requested to be ordered by (line 5).

When no index exists on the column of the left-side table for which the order is requested (line 6), the index determination module 334 creates a sort operation on column of the left-side table on which the sort is requested, and, at line 7, the split and merge module 336 then reads a row from the left-side table. When an index or sort operation exists on the column of the left-side table for which the order is requested (line 7), the split and merge module 336 proceeds, at line 7, to read a row from the left-side table.

When the value read from the left-side Order By column is the same as a previous value or does not find any previous value (line 8), the split and merge module 336 obtains, at line 9, the matching row(s) from the right-side table based on the join condition, and determines, at line 10, whether an index, that is used on the right-side table, has a prefix component which is part of the Order By (i.e. the sort). If so (line 12), the split and merge module 336 stores the rows in a buffer along with left-side column value, before returning to read another row from the left-side table at line 7. If not (line 11), the split and merge module 336 sorts the matching right-side table rows on the column, which is identified by the Order By, and, at line 12, the merge and split module 336 stores the rows in a buffer along with left-side column value, before returning to read another row from the left-side table at line 7.

When the value read from the left-side Order By column is not the same as a previous value (line 13), the split and merge module 336 gets the sorted lists stored in the buffers and merges those. This partial set of resultant rows is sent (line 14) to the client and the pseudo algorithm returns to line 7. Lines 7-14 of the pseudo algorithm may be repeated until all rows in the left-side table have been read.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   receiving, using one or more processors, a query including a set operation and a sort operation, wherein the set operation includes a first data structure and a second data structure and the sort operation requests a result set that is sorted based on a first column or attribute of the first data structure and a second column or attribute of the second data structure, wherein the first column or attribute and the second column or attribute are specified in the sort operation, wherein the first column or attribute and the second column or attribute are distinct, and wherein the set operation and the sort operation are distinct, explicit operations within the query;
   generating, using the one or more processors, a query plan in which the sort operation occurs prior to the set operation;
   determining, using the one or more processors, a set of one or more resultant rows responsive to the query; and
   sending, using the one or more processors, the set of one or more resultant rows responsive to the query to a client.

2. The computer-implemented method of claim 1 including:
   determining, using the one or more processors, another set of one or more resultant rows responsive to the query; and
   sending, using the one or more processors, the another set of one or more resultant rows responsive to the query to the client.

3. The computer-implemented method of claim 2, wherein a full result set comprises the set of one or more resultant rows responsive to the query, and the another set of one or more resultant rows responsive to the query.

4. The computer-implemented method of claim 1, wherein determining the set of one or more resultant rows responsive to the query includes:
   buffering a first portion of the set of one or more resultant rows; and
   merging a second portion of the set of one or more resultant rows to the first portion of the set of one or more resultant rows in the buffer,
   wherein the first portion and second portion of the set of one or more resultant rows have a common value in the first column or attribute of the first data structure on which the sort operation is requested.

5. The computer-implemented method of claim 4 including:
   reading a row from the first data structure;
   determining the row from the first data structure has a different value in the first column or attribute of the first data structure on which the sort operation is requested;
   responsive to determining the row from the first data structure has different value in the first column or attribute of the first data structure and after merging the second portion of the set of one or more resultant rows to the first portion of the set of one or more resultant rows in the buffer, sending the first portion and second portion of the set of one or more resultant rows, as the set of one or more resultant rows; and
   clearing the buffer.

6. The computer-implemented method of claim 1 including:
   determining, using the one or more processors, whether the first column or attribute of the first data structure has an index of the first data structure defined on it; and
   determining, using the one or more processors, whether the second column or attribute of the second data structure has an index of the second data structure defined on it.

7. The computer-implemented method of claim 1, wherein the first data structure and the second data structure are relational tables.

8. The computer-implemented method of claim 1, wherein the first data structure and the second data structure are non-relational data structures.

9. The computer-implemented method of claim 1, wherein the query uses structured query language (SQL).

10. The computer-implemented method of claim 1, wherein the set operation is one or more of an inner join, left outer join, right outer join, full outer join and cross join.

11. A system comprising:
one or more processors; and
a memory storing instructions that, when executed by the one or more processors, cause the system to:
receive a query including a set operation and a sort operation, wherein the set operation includes a first data structure and a second data structure and the sort operation requests a result set that is sorted based on a first column or attribute of the first data structure and a second column or attribute of the second data structure, wherein the first column or attribute and the second column or attribute are specified in the sort operation, wherein the first column or attribute and the second column or attribute are distinct, and wherein the set operation and the sort operation are distinct, explicit operations within the query;
generate a query plan in which the sort operation occurs prior to the set operation;
determine a set of one or more resultant rows responsive to the query; and
send the set of one or more resultant rows responsive to the query to a client.

12. The system of claim 11, wherein the instructions, when executed by the one or more processors, cause the system to:
determining, using the one or more processors, another set of one or more resultant rows responsive to the query; and
sending, using the one or more processors, the another set of one or more resultant rows responsive to the query to the client.

13. The system of claim 12, wherein a full result set comprises the set of one or more resultant rows responsive to the query, and the another set of one or more resultant rows responsive to the query.

14. The system of claim 11, wherein determining the set of one or more resultant rows responsive to the query includes:
buffering a first portion of the set of one or more resultant rows; and
merging a second portion of the set of one or more resultant rows to the first portion of the set of one or more resultant rows in the buffer,
wherein the first portion and second portion of the set of one or more resultant rows have a common value in the first column or attribute of the first data structure on which the sort operation is requested.

15. The system of claim 14, wherein the instructions, when executed by the one or more processors, cause the system to:
read a row from the first data structure;
determine the row from the first data structure has a different value in the first column or attribute of the first data structure on which the sort operation is requested;
responsive to determining the row from the first data structure has different value in the first column or attribute of the first data structure and after merging the second portion of the set of one or more resultant rows to the first portion of the set of one or more resultant rows in the buffer, send the first portion and second portion of the set of one or more resultant rows, as the set of one or more resultant rows; and
clear the buffer.

16. The system of claim 11, wherein the instructions, when executed by the one or more processors, cause the system to:
determine whether the first column or attribute of the first data structure has an index of the first data structure defined on it; and
determine whether the second column or attribute of the second data structure has an index of the second data structure defined on it.

17. The system of claim 11, wherein the first data structure and the second data structure are relational tables.

18. The system of claim 11, wherein the first data structure and the second data structure are non-relational data structures.

19. The system of claim 11, wherein the query uses structured query language (SQL).

20. The system of claim 11, wherein the set operation is one or more of an inner join, left outer join, right outer join, full outer join and cross join.

* * * * *